United States Patent
Singh et al.

(10) Patent No.: US 10,999,497 B1
(45) Date of Patent: May 4, 2021

(54) SYSTEM FOR PARALLELLY PROCESSING IMAGE LINES FROM MULTIPLE IMAGE SENSORS

(71) Applicant: NXP USA, Inc., Austin, TX (US)

(72) Inventors: Chanpreet Singh, Nagar (IN); Stephan Matthias Herrmann, Markt Schwaben (DE); Gaurav Gupta, Noida (IN); Rahul Jain, Noida (IN)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 16/836,890

(22) Filed: Mar. 31, 2020

(51) Int. Cl.
*H04N 5/232* (2006.01)
*H04N 5/225* (2006.01)

(52) U.S. Cl.
CPC ....... *H04N 5/23227* (2018.08); *H04N 5/2258* (2013.01); *H04N 5/23229* (2013.01)

(58) Field of Classification Search
CPC ............. H04N 5/2258; H04N 5/23227; H04N 5/23229; H04N 5/247; G06T 1/20; G06F 9/28; G06F 9/38; G06F 9/3885–3897; G06F 13/1615
See application file for complete search history.

(56) References Cited

U.S. PATENT DOCUMENTS

| | | | |
|---|---|---|---|
| 5,872,985 A | 2/1999 | Kimura | |
| 6,101,599 A | 8/2000 | Wright et al. | |
| 8,154,610 B2 | 4/2012 | Jo et al. | |
| 8,493,482 B2 | 7/2013 | Cote et al. | |
| 8,683,184 B1 | 3/2014 | Lew et al. | |
| 2003/0222860 A1* | 12/2003 | Yamaura | G06T 1/60 345/204 |
| 2006/0062491 A1* | 3/2006 | Chen | G06T 1/20 382/303 |
| 2019/0313026 A1* | 10/2019 | Cheng | G06T 1/20 |

* cited by examiner

*Primary Examiner* — Paul M Berardesca
(74) *Attorney, Agent, or Firm* — Rajeev Madnawat (57) ABSTRACT

A system-on-chip (SoC) includes first and second processing circuits and a data exchange circuit such that the first processing circuit is configured to process image lines based on corresponding sets of processing attributes. The first processing circuit is further configured to continuously receive and process the image lines one after the other to generate corresponding output data, and the second processing circuit is configured to continuously receive by way of the data exchange circuit, the generated output data for processing the generated output data. The data exchange circuit is thus configured to control data flow between the first processing circuit and the second processing circuit such that the first processing circuit and the second processing circuit parallelly process corresponding data associated with same or different image lines.

20 Claims, 9 Drawing Sheets

SYSTEM FOR PARALLELLY PROCESSING IMAGE LINES FROM MULTIPLE IMAGE SENSORS

BACKGROUND

The present disclosure relates generally to image processing, and, more particularly, to a system for parallelly processing multiple image lines on a system-on-chip (SoC).

An SoC typically receives and processes image lines that are associated with a single image or multiple images. The image lines may be captured by various image sensors that have high resolution and high frame rate. Typically for on-the-fly (OTF) processing of such image lines, the captured image lines are stitched to generate a large image stream. However, the stitching of the image lines on the SoC causes latency in the OTF processing. Further, the quality of such a large image stream is degraded due to different exposure values and resolutions of the image sensors. To overcome the problem associated with the stitching of the image lines, the captured image lines are processed by an SoC one at a time. However, the image sensors generate the image lines at a high speed which leads to a processing overhead and a delay in processing of the image lines as the SoC is capable of processing only one image line at a time. Thus, there is a need for a technical solution that overcomes the aforementioned problems.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

In one embodiment, the present disclosure provides a system-on-chip (SoC) that includes first and second processing circuits and a data exchange circuit. The first processing circuit is configured to receive and process a first image line based on a first set of processing attributes to generate first output data, and a second image line based on a second set of processing attributes to generate second output data. Further, the second image line is processed after the first image line is processed. The data exchange circuit is coupled between the first processing circuit and the second processing circuit. The data exchange circuit is configured to provide the first and second output data from the first processing circuit to the second processing circuit based on an availability of the second processing circuit to process the first and second output data, respectively. The second processing circuit is configured to parallelly process the first output data when the first processing circuit processes the second image line.

In another embodiment, the present disclosure provides a method for processing a plurality of image lines. The method includes processing, by a first processing circuit of an SoC, a first image line of the plurality of image lines based on a first set of processing attributes to generate first output data, and a second image line of the plurality of image lines based on a second set of processing attributes to generate second output data. Further, the second image line is processed after the first image line is processed. The method further includes providing, by a data exchange circuit of the SoC, the first and second output data from the first processing circuit to a second processing circuit of the SoC based on an availability of the second processing circuit to process the first and second output data, respectively. The method further includes processing, by the second processing circuit, the first output data parallelly when the second image line is being processed by the first processing circuit.

Various embodiments of the present disclosure provide an SoC that includes first and second processing circuits and a data exchange circuit. The first processing circuit is configured to process each image line based on respective processing attributes, such that a subsequent image line is processed after the current image line is processed. The image lines are processed to generate corresponding output data. The data exchange circuit is configured to provide the generated output data from the first processing circuit to the second processing circuit based on an availability of the second processing circuit to process the generated output data one at a time. The second processing circuit is configured to parallelly process the output data that is generated based on the current image line when the first processing circuit processes the subsequent image line.

As the image lines are processed based on a set of processing attributes such as trigger identifiers (that indicate an order of processing the image lines) and configuration parameters (that indicate image features of the image lines), the quality of the processed image lines remains unaffected due to different exposure values, different resolutions, and different frame rates of multiple image sensors that capture the image lines. Further, the first and second processing circuits process the image lines one after the other and refrain from stitching of the image lines. Thus, the latency for on-the-fly processing of each image line is reduced as compared to the latency incurred by conventional techniques that implement stitching of the image lines. Additionally, the first processing circuit and the second processing circuit are able to process different image lines parallelly, thereby reducing a processing overhead and a delay in processing of the multiple image lines as compared to conventional systems that were unable to process different image lines parallelly.

Figure 1:
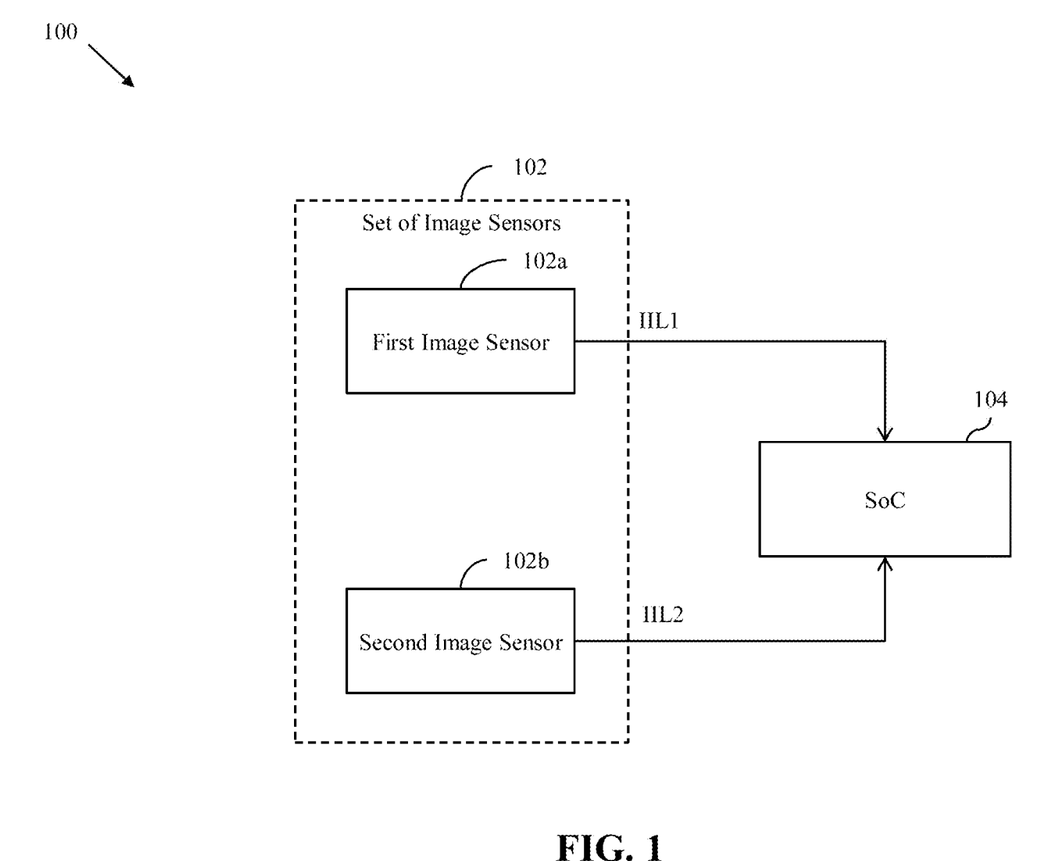
FIG. 1 is a schematic block diagram of a system for parallelly processing multiple image lines in accordance with an embodiment of the present disclosure.

Referring now to FIG. 1, a schematic block diagram of a system 100 for parallelly processing multiple image lines (hereinafter referred to as "input image lines"), in accordance with an embodiment of the present disclosure is shown. Each input image line represents an array of pixel data of a corresponding input image. The system 100 may be utilized in an automotive application such as an advanced driver alert system (ADAS), a consumer application such as a home security system, or an industrial application such as an industrial robotic system. The system 100 includes multiple image sensors 102 of which first and second image sensors 102a and 102b are shown. The system 100 further includes a system-on-chip (SoC) 104.

The first and second image sensors 102a and 102b capture first and second input images, respectively. In an example, the first and second image sensors 102a and 102b capture and output first and second input image lines IIL1 and IIL2 that are associated with the first and second input images, respectively. In presently preferred embodiment, the first and second image sensors 102a and 102b have different resolutions, different frame rates, and different exposure values. In another embodiment, the first and second image sensors 102a and 102b have same resolutions, same frame rates, and same exposure values. Examples of the first and second image sensors 102a and 102b include a bayer image sensor, a monochrome image sensor, an infrared bayer image sensor, and the like. It will be apparent to those of skill in the art that the scope of the system 100 is not limited to two image sensors, and may include any number of image sensors without deviating from the scope of the disclosure.

The SoC 104 is coupled with external image sensors, i.e., the first and second image sensors 102a and 102b, for receiving the first and second input image lines IIL1 and IIL2, respectively. The SoC 104 processes the first and second input image lines IIL1 and IIL2 based on first and second sets of processing attributes, to generate first and second processed data (shown later in FIG. 2), respectively. The first and second sets of processing attributes are associated with the processing of the first and second input image lines IIL1 and IIL2 captured by the first and second image sensors 102a and 102b, respectively.

Figure 2:
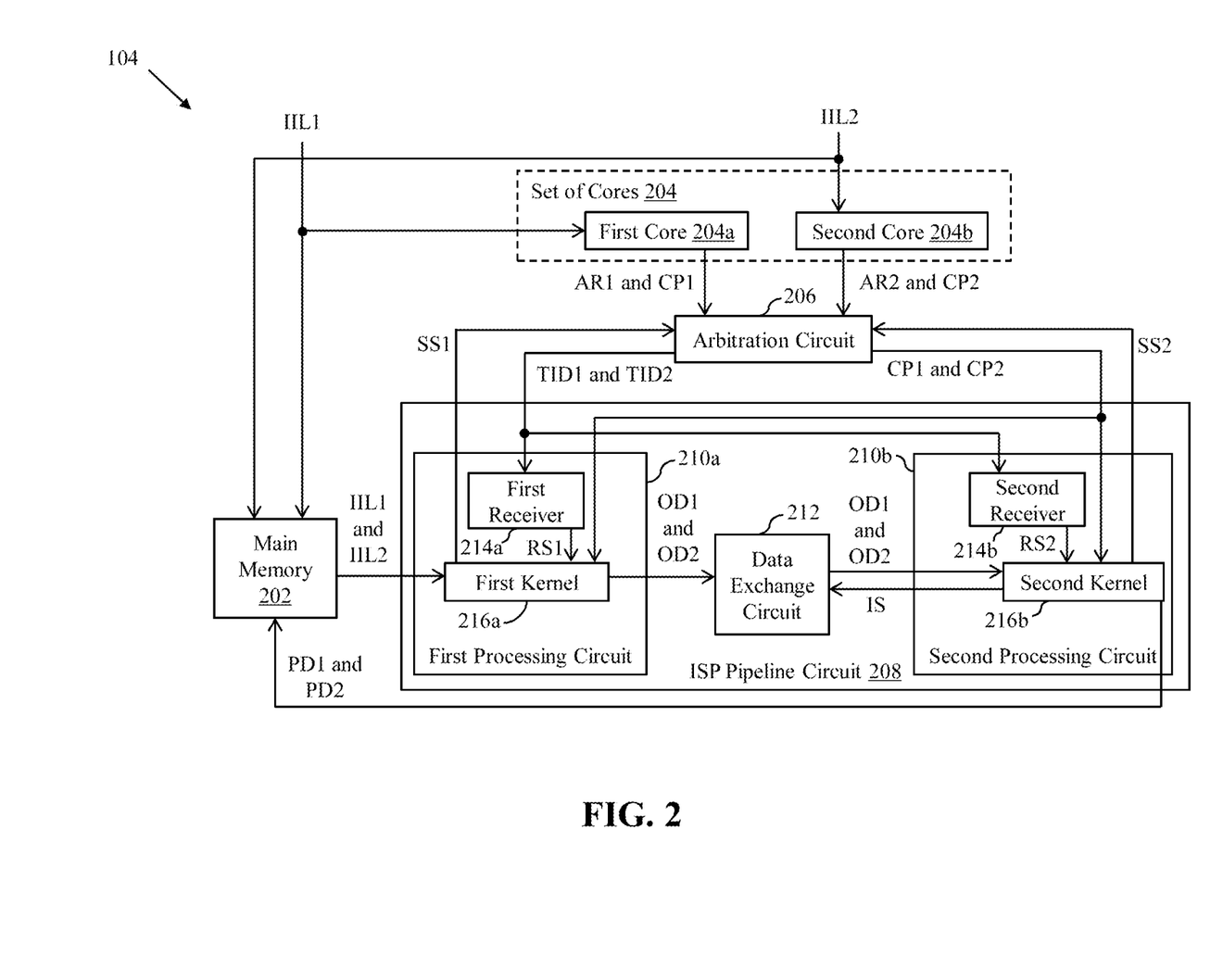
FIG. 2 is a schematic block diagram of a system-on-chip (SoC) of the system of FIG. 1 in accordance with an embodiment of the present disclosure.

Referring now to FIG. 2, a schematic block diagram of the SoC 104, in accordance with an embodiment of the present disclosure is shown. The SoC 104 includes a main memory 202, a set of cores 204 of which first and second cores 204a and 204b are shown, an arbitration circuit 206, and an image signal processing (ISP) pipeline circuit 208.

The main memory 202 is coupled with the first and second image sensors 102a and 102b, and is configured to receive the first and second input image lines IIL1 and IIL2. In one example, the main memory 202 is a random-access memory (RAM), such as a video RAM. The main memory 202 is further configured to store the received first and second input image lines IIL1 and IIL2.

The set of cores 204 (i.e., the first and second cores 204a and 204b) is coupled with the first and second image sensors 102a and 102b, and is configured to receive the first and second input image lines IIL1 and IIL2 from the first and second image sensors 102a and 102b, respectively. The first and second cores 204a and 204b are further configured to generate first and second access requests AR1 and AR2 and first and second sets of configuration parameters CP1 and CP2 that are associated with the processing of the first and second input image lines IIL1 and IIL2, respectively. Each of the first and second sets of configuration parameters CP1 and CP2 includes at least one of image features such as a color, a gain, a region of interest, a resolution, a frame number, a line number and the like, of a corresponding input image line, such as the first or second input image line IIL1 or IIL2, captured by an image sensor, such as the first or second image sensor 102a or 102b. It will be apparent to those of skill in the art that the scope of the SoC 104 is not limited to two cores, and may include any number of cores without deviating from the scope of the disclosure. It will further be apparent to those of skill in the art that even though in the current embodiment, the first and second cores 204a and 204b are coupled with the first and second image sensors 102a and 102b, and generate the first and second access requests AR1 and AR2, respectively, in other embodiments, a single core, such as the first core 204a, is coupled with both the first and second image sensors 102a and 102b, and generates the first and second access requests AR1 and AR2, respectively.

The set of cores 204 is coupled with the arbitration circuit 206, and is further configured to provide the first and second access requests AR1 and AR2 and the first and second sets of configuration parameters CP1 and CP2, respectively, to the arbitration circuit 206. The arbitration circuit 206 is thus configured to receive the first and second access requests AR1 and AR2 and the first and second sets of configuration parameters CP1 and CP2, respectively. The arbitration circuit 206 is further configured to generate first and second trigger identifiers (IDs) TID1 and TID2 based on the first and second access requests AR1 and AR2, respectively, and output the first and second trigger IDs TID1 and TID2 and the first and second sets of configuration parameters CP1 and CP2, respectively. The first and second trigger IDs TID1 and TID2 are indicative of an order of triggering the processing of the first and second input image lines IIL1 and IIL2, respectively. The first set of processing attributes includes the first trigger ID TID1 and the first set of configuration parameters CP1, and the second set of processing attributes includes the second trigger ID TID2 and the second set of configuration parameters CP2. The structure and working of the arbitration circuit 206 is explained in detail in FIG. 3.

The ISP pipeline circuit 208 is coupled with the arbitration circuit 206. The ISP pipeline circuit 208 includes multiple processing circuits of which a first processing circuit 210a and a second processing circuit 210b are shown, for processing the first and second input image lines IIL1 and IIL2, respectively. Each processing circuit executes an image processing function. Examples of the image processing functions include image decompression, color temperature detection, white balance correction, dynamic range adjustment, vignetting effect correction, and the like. In an embodiment, the first processing circuit 210a and the second processing circuit 210b execute the image processing functions such as image decompression and vignetting effect correction, respectively. It will be apparent to a person skilled in the art that a number of processing circuits in the ISP pipeline circuit 208 is based on a number of image processing functions to be executed by the ISP pipeline circuit 208. Thus, to execute the image processing functions such as color temperature detection, white balance correction, and dynamic range adjustment, the ISP pipeline circuit 208 includes three additional processing circuits (not shown). The ISP pipeline circuit 208 further includes a data exchange circuit 212 that is coupled between two processing circuits, i.e., the first processing circuit 210a and the second processing circuit 210b. Thus, it will be further apparent to a person skilled in the art that a number of data exchange circuits in the ISP pipeline circuit 208 is based on the number of processing circuits in the ISP pipeline circuit 208.

The first processing circuit 210a is coupled with the main memory 202 and the arbitration circuit 206, and is configured to receive the first and second input image lines IIL1 and IIL2 from the main memory 202, and receive the first and second trigger IDs TID1 and TID2 and the first and second sets of configuration parameters CP1 and CP2 from the arbitration circuit 206, respectively. The first processing circuit 210a is further configured to process the first and second input image lines IIL1 and IIL2 to generate first and second output data OD1 and OD2 based on the first and second trigger IDs TID1 and TID2 and the first and second sets of configuration parameters CP1 and CP2, i.e., the first and second sets of processing attributes, respectively. The second input image line IIL2 is processed after the first input image line IIL1 is processed. The first processing circuit 210a is further coupled with the data exchange circuit 212, and is further configured to provide the first and second output data OD1 and OD2 to the data exchange circuit 212.

The first processing circuit 210a includes a first receiver 214a and a first kernel 216a. The first receiver 214a is coupled with the arbitration circuit 206, and is configured to receive the first and second trigger IDs TID1 and TID2. In one embodiment, the first receiver 214a stores the first and second trigger IDs TID1 and TID2 in an order of reception of the first and second trigger IDs TID1 and TID2 in an internal memory (not shown) of the first receiver 214a. The first receiver 214a is further configured to generate a first reception signal RS1 that is indicative of a reception of at least one of the first and second trigger IDs TID1 and TID2 by the first receiver 214a.

The first kernel 216a is an image processing kernel that performs an image processing function such as image decompression, image correction, or the like. The first kernel 216a is coupled with the main memory 202, the first receiver 214a, and the arbitration circuit 206. The first kernel 216a is configured to receive at least one of the first and second input image lines IIL1 and IIL2 at a time from the main memory 202. The first kernel 216a is further configured to receive the first reception signal RS1 from the first receiver 214a, generate a first status signal SS1 that indicates an availability of the first processing circuit 210a to receive at least one of the first and second sets of configuration parameters CP1 and CP2, i.e., at least one of the first and second sets of processing attributes, at a time, and provide the first status signal SS1 to the arbitration circuit 206. Based on the first reception signal RS1, the first kernel 216a is triggered to process at a time, at least one of the first and second input image lines IIL1 and IIL2 to generate at least one of the first and second output data OD1 and OD2, respectively. The first kernel 216a is further configured to activate the first status signal SS1 for receiving at least one of the first and second sets of configuration parameters CP1 and CP2, and deactivate the first status signal SS1 when the first kernel 216a is processing at least one of the first and second input image lines IIL1 and IIL2.

The second processing circuit 210b is coupled with the arbitration circuit 206, and is configured to receive the first and second trigger IDs TID1 and TID2 and the first and second sets of configuration parameters CP1 and CP2, respectively. The second processing circuit 210b is further configured to receive the first and second output data OD1 and OD2 and process the first and second output data OD1 and OD2 to generate the first and second processed data PD1 and PD2 based on the first and second trigger IDs TID1 and TID2 and the first and second sets of configuration parameters CP1 and CP2, i.e., the first and second sets of processing attributes, respectively. The second output data OD2 is processed after the first output data OD1 is processed. The second processing circuit 210b receives the second output data OD2 and the second set of configuration parameters CP2 when the second processing circuit 210b has generated the first processed data PD1.

The second processing circuit 210b includes a second receiver 214b and a second kernel 216b. The second receiver 214b is structurally and functionally similar to the first receiver 214a. The second receiver 214b is coupled with the arbitration circuit 206, and is configured to receive the first and second trigger IDs TID1 and TID2 and generate a second reception signal RS2 that is indicative of a reception of at least one of the first and second trigger IDs TID1 and TID2 by the second receiver 214b.

The second kernel 216b is structurally and functionally similar to the first kernel 216a. The second kernel 216b is coupled with the data exchange circuit 212 and the second receiver 214b, and is configured to receive one of the first and second output data OD1 and OD2 at a time from the data exchange circuit 212, and receive the second reception signal RS2 from the second receiver 214b. The second kernel 216b is further coupled with the arbitration circuit 206, and is further configured to generate a second status signal SS2 that is indicates an availability of the second kernel 216b to receive at least one of the first and second sets of configuration parameters CP1 and CP2, i.e., at least one of the first and second sets of processing attributes, at a time, and provide the second status signal SS2 to the arbitration circuit 206. Based on the second reception signal RS2, the second kernel 216b is further configured to process at a time, at least one of the first and second output data OD1 and OD2 to generate at least one of the first and second processed data PD1 and PD2, respectively. The second kernel 216b is further configured to activate the second status signal SS2 for receiving at least one of the first and second sets of configuration parameters CP1 and CP2, and deactivate the second status signal SS2 when the second kernel 216b is processing at least one of the first and second output data OD1 and OD2. The second processing circuit 210b is further configured to generate an indication signal IS and provide the indication signal IS to the data exchange circuit 212 to indicate an availability of the second processing circuit 210b for processing at least one of the first and second output data OD1 and OD2. The indication signal IS is indicative of a completion of a processing of the received output data, such as the first output data OD1, by the second processing circuit 210b, and the second processing circuit 210b being available to receive subsequent output data, such as the second output data OD2.

The data exchange circuit 212 is coupled between the first processing circuit 210a and the second processing circuit 210b to control a flow of data between the first processing circuit 210a and the second processing circuit 210b. The data exchange circuit 212 is configured to receive the indication signal IS and provide the output data (such as the first output data OD1) received from the first processing circuit 210a to the second processing circuit 210b when the second processing circuit 210b is available to receive the output data, such that the second processing circuit 210b and the first processing circuit 210a parallelly process the received output data and the subsequent input image line (such as the second input image line IIL2), respectively. The second processing circuit 210b is available to receive the subsequent output data when the second processing circuit 210b has generated the processed data (such as the first processed data PD1) that is associated with the previously received output data (i.e., the first output data OD1). In one embodiment, the data exchange circuit 212 provides at least one of the first and second output data OD1 and OD2 from the first processing circuit 210a to the second processing circuit 210b based on an availability of the second processing circuit 210b to process the first and second output data OD1 and OD2, respectively, when the indication signal IS is activated.

The data exchange circuit 212 includes a first-in-first-out (FIFO) memory (not shown) that receives and stores the first and second output data OD1 and OD2. In one example, when the data exchange circuit 212 receives the first output data OD1 from the first processing circuit 210a, and the second processing circuit 210b is unavailable to receive and process the first output data OD1, the first output data OD1 is queued in the FIFO memory. Further, the queued first output data OD1 is provided to the second processing circuit 210b when the second processing circuit 210b is available for receiving and processing the first output data OD1. Similarly, the second output data OD2 is queued when the data exchange circuit 212 receives the second output data OD2 and the second processing circuit 210b is unavailable to receive and process the second output data OD2.

The main memory 202 is further coupled with the second processing circuit 210b, and is configured to receive the first and second processed data PD1 and PD2 and store the first and second processed data PD1 and PD2, respectively.

Figure 3:
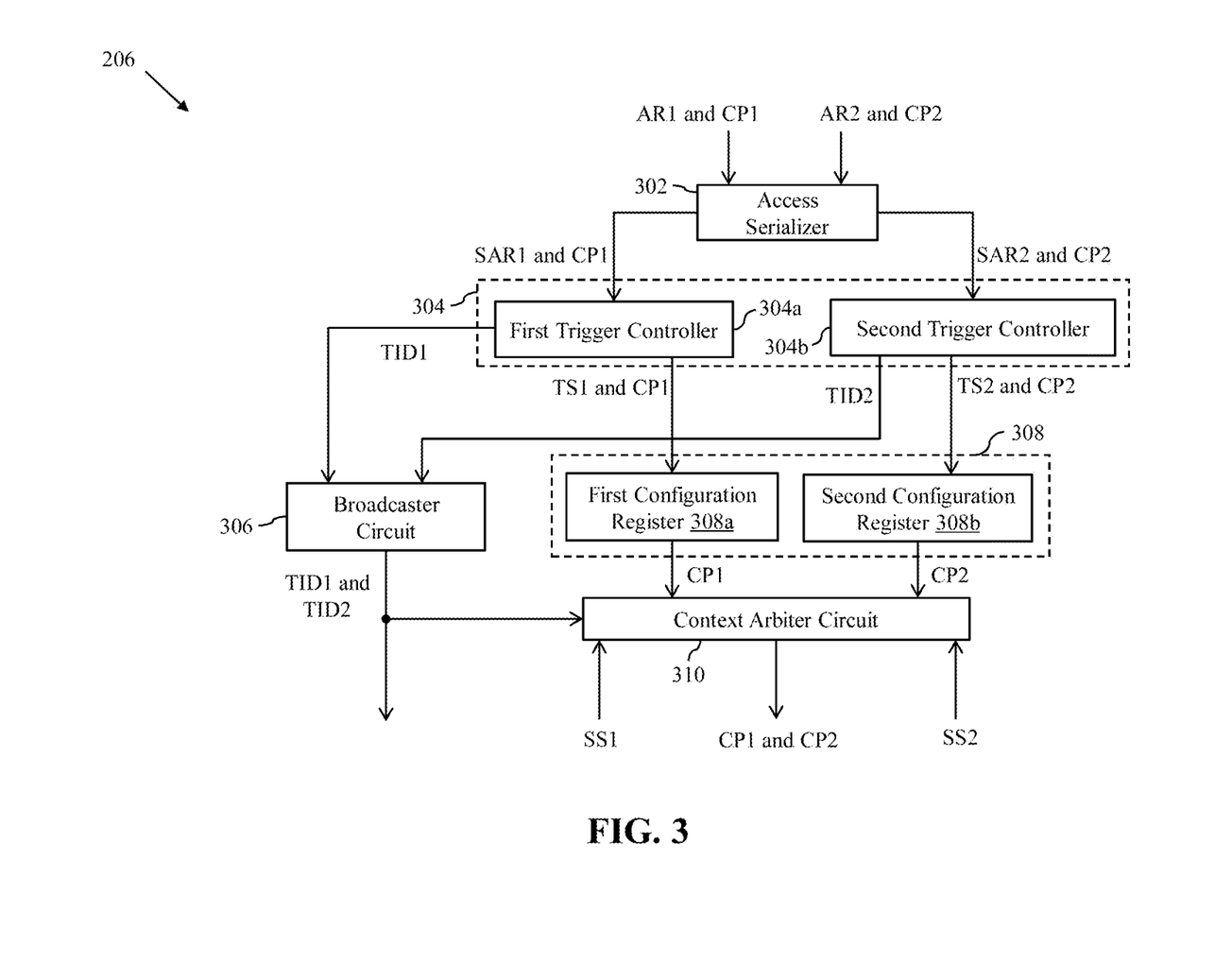
FIG. 3 is a schematic block diagram of an arbitration circuit of the SoC of FIG. 2 in accordance with an embodiment of the present disclosure.

Referring now to FIG. 3, a schematic block diagram of the arbitration circuit 206, in accordance with an embodiment of the present disclosure is shown. The arbitration circuit 206 includes an access serializer 302, multiple trigger controllers 304 of which first and second trigger controllers 304a and 304b are shown, a broadcaster circuit 306, multiple configuration registers 308 of which first and second configuration registers 308a and 308b are shown, and a context arbiter circuit 310.

The access serializer 302 is coupled with the first and second cores 204a and 204b, and is configured to receive the first and second access requests AR1 and AR2, and the first and second sets of configuration parameters CP1 and CP2, respectively. The access serializer 302 is further configured to serialize the first and second access requests AR1 and AR2 to output the serialized first and second access requests SAR1 and SAR2, respectively. In an embodiment, the access serializer 302 executes a scheduling algorithm such as a round-robin scheduling algorithm, to serialize the first and second access requests AR1 and AR2 and output the serialized first and second access requests SAR1 and SAR2 one after the other. In an example, when the first access request AR1 is received before the second access request AR2, the access serializer 302 outputs the serialized first access request SAR1 before the serialized second access request SAR2. In another example, when the first and second access requests AR1 and AR2 are received simultaneously at the same time instant or during a single clock cycle, the access serializer 302 outputs the serialized first and second access requests SAR1 and SAR2 one after the other (i.e., outputs the serialized first access request SAR1 or the serialized second access request SAR2). The access serializer 302 is further configured to output the first and second sets of configuration parameters CP1 and CP2 along with the serialized first and second access requests SAR1 and SAR2, respectively.

The first and second trigger controllers 304a and 304b are coupled with the access serializer 302, and are configured to receive the serialized first and second access requests SAR1 and SAR2 and the first and second sets of configuration parameters CP1 and CP2 from the first and second trigger controllers 304a and 304b, respectively. The first and second trigger controllers 304a and 304b are further configured to decode the serialized first and second access requests SAR1 and SAR2 to generate first and second trigger signals TS1 and TS2 and the first and second trigger IDs TID1 and TID2, respectively. The first and second trigger controllers 304a and 304b are further configured to activate the first and second trigger signals TS1 and TS2, when the first and second trigger controllers 304a and 304b decode the serialized first and second access requests SAR1 and SAR2, respectively.

It will be apparent to those of skill in the art that the scope of the arbitration circuit 206 is not limited to two trigger controllers, and may include any number of trigger controllers based on a number of image sensors without deviating from the scope of the disclosure.

The first and second configuration registers 308a and 308b are coupled with the first and second trigger controllers 304a and 304b. The first and second configuration registers 308a and 308b are configured to receive the first and second trigger signals TS1 and TS2 and the first and second sets of configuration parameters CP1 and CP2 from the first and second trigger controllers 304a and 304b, respectively. When the first and second trigger signals TS1 and TS2 are activated, the first and second configuration registers 308a and 308b receive the first and second sets of configuration parameters CP1 and CP2 from the first and second trigger controllers 304a and 304b, respectively.

It will be apparent to those of skill in the art that the scope of the arbitration circuit 206 is not limited to two configuration registers, and may include any number of configuration registers based on a number of image sensors without deviating from the scope of the disclosure.

The broadcaster circuit 306 is coupled with the first and second trigger controllers 304a and 304b. The broadcaster circuit 306 is configured to receive the first and second trigger IDs TID1 and TID2 from the first and second trigger controllers 304a and 304b, respectively, and output the first and second trigger IDs TID1 and TID2 based on an order of reception of the first and second trigger IDs TID1 and TID2, respectively.

The context arbiter circuit 310 is coupled with the broadcaster circuit 306, and is configured to receive the first and second trigger IDs TID1 and TID2 and the first and second status signals SS1 and SS2. The context arbiter circuit 310 is further configured to select the first and second configuration registers 308a and 308b based on the first and second trigger IDs TID1 and TID2 for receiving the first and second sets of configuration parameters CP1 and CP2 therefrom. The context arbiter circuit 310 is further configured to provide at a time, at least one of the first and second sets of configuration parameters CP1 and CP2 to the first processing circuit 210a when the first status signal SS1 is activated, and at least one of the first and second sets of configuration parameters CP1 and CP2 to the second processing circuit 210b when the second status signal SS2 is activated.

Figure 4:
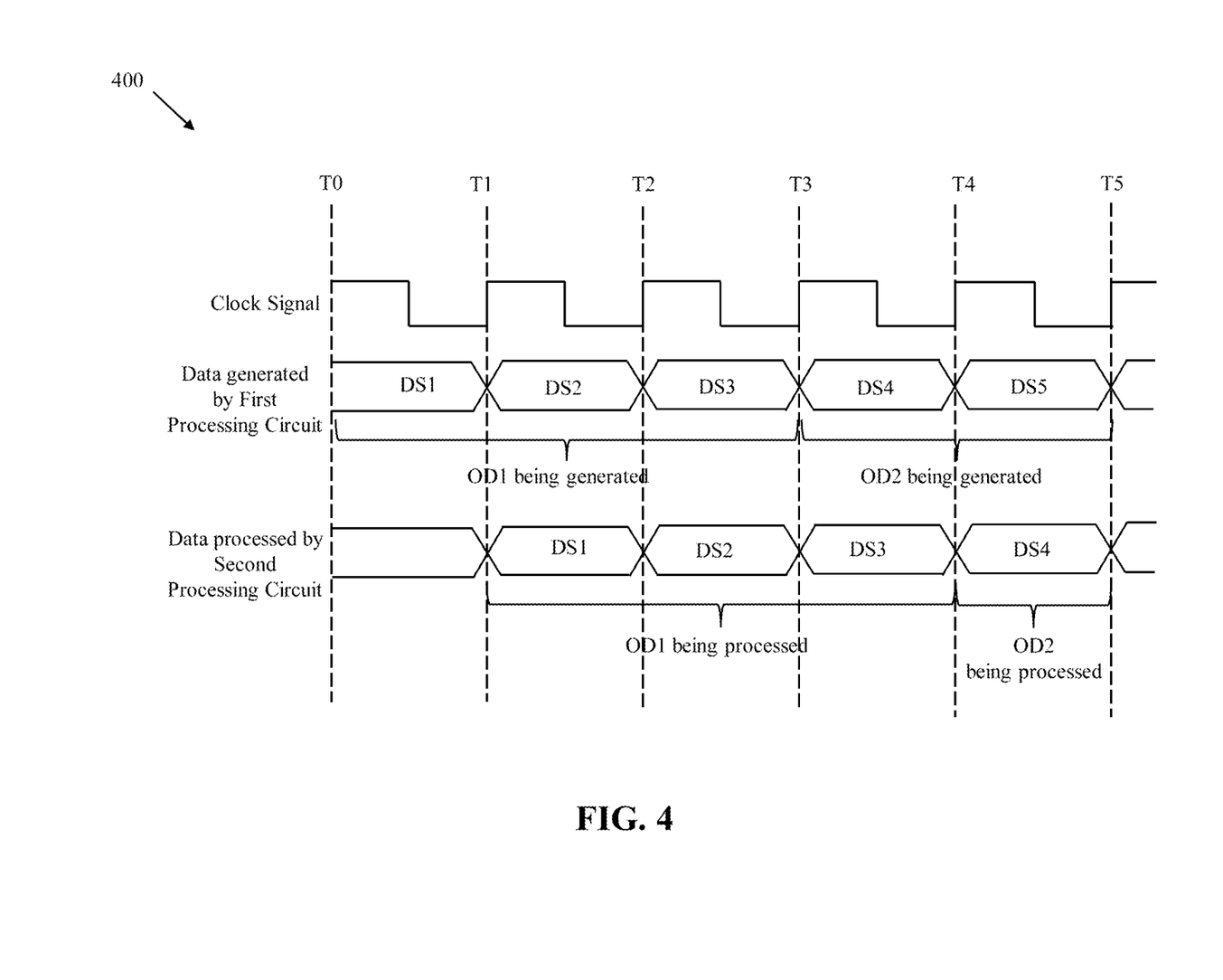
FIG. 4 is a timing diagram that illustrates an operation of first and second processing circuits of the SoC of FIG. 2 in accordance with an embodiment of the present disclosure.

Referring now to FIG. 4, a timing diagram 400 illustrating an operation of the first processing circuit 210a and the second processing circuit 210b in accordance with an embodiment of the present disclosure is shown. In the embodiment, the SoC 104 includes a clock generator circuit (not shown) that generates a clock signal for controlling the operation of the first processing circuit 210a and the second processing circuit 210b. In one example, the first output data OD1 includes first through third data segments DS1-DS3 and the second output data OD2 includes fourth and fifth data segments DS4 and DS5.

During time duration T0-T1, the first processing circuit 210*a* is available for processing the first input image line IIL1. Thus, the first processing circuit 210*a* receives and processes the first input image line IIL1 to generate the first data segment DS1. The first processing circuit 210*a* provides the first data segment DS1 to the data exchange circuit 212.

At time instant T1, the data exchange circuit 212 determines that the second processing circuit 210*b* is available for receiving and processing the first data segment DS1 based on the indication signal IS. The data exchange circuit 212 thus provides the first data segment DS1 to the second processing circuit 210*b*.

During time duration T1-T2, the first processing circuit 210*a* continues to process the first input image line IIL1 to generate the second data segment DS2. The first processing circuit 210*a* provides the second data segment DS2 to the data exchange circuit 212. As the data exchange circuit 212 determines based on the indication signal IS that the second processing circuit 210*b* is unavailable to receive and process the second data segment DS2 since the second processing circuit 210*b* is processing the first data segment DS1, the second data segment DS2 is queued in the FIFO memory.

At time instant T2, the second processing circuit 210*b* completes the processing of the first data segment DS1. Thus, the indication signal IS indicates that the second processing circuit 210*b* is available for receiving and processing the second data segment DS2. The data exchange circuit 212 hence provides the second data segment DS2 to the second processing circuit 210*b*.

During time duration T2-T3, the first processing circuit 210*a* continues to process the first input image line IIL1 to generate the third data segment DS3 and the second processing circuit 210*b* processes the second data segment DS2. The first processing circuit 210*a* provides the third data segment DS3 to the data exchange circuit 212. As the second processing circuit 210*b* is processing the second data segment DS2, the indication signal IS indicates unavailability of the second processing circuit 210*b* to receive and process the third data segment DS3. The third data segment DS3 is thus queued in the FIFO memory.

At time instant T3, the first processing circuit 210*a* completes the processing of the first input image line IIL1 to generate the first output data OD1 completely and activates the first status signal SS1. The second processing circuit 210*b* completes the processing of the second data segment DS2. Thus, the indication signal IS indicates that the second processing circuit 210*b* is available for receiving and processing the third data segment DS3. The data exchange circuit 212 hence provides the third data segment DS3 to the second processing circuit 210*b*.

During time duration T3-T4, the first processing circuit 210*a* receives and processes the second input image line IIL2 to generate the fourth data segment DS4 and the second processing circuit 210*b* processes the third data segment DS3. The first processing circuit 210*a* provides the fourth data segment DS4 to the data exchange circuit 212. As the second processing circuit 210*b* is processing the third data segment DS3, the indication signal IS indicates unavailability of the second processing circuit 210*b* to receive and process the fourth data segment DS4. The fourth data segment DS4 is thus queued in the FIFO memory.

At time instance T4, the second processing circuit 210*b* completes the processing of the first output data OD1 to generate the first processed data PD1 completely. Further, the second processing circuit 210*b* activates the second status signal SS2 when the first processed data PD1 is completely generated. The indication IS indicates that the second processing circuit 210*b* is available for receiving and processing the fourth data segment DS4. The data exchange circuit 212 hence provides the fourth data segment DS4 to the second processing circuit 210*b*.

During time duration T4-T5, the first processing circuit 210*a* continues to process the second input image line IIL2 to generate the fifth data segment DS5 and the second processing circuit 210*b* processes the fourth data segment DS4. The first processing circuit 210*a* provides the fifth data segment DS5 to the data exchange circuit 212. As the second processing circuit 210*b* is processing the fourth data segment DS4, the indication signal IS indicates unavailability of the second processing circuit 210*b* to receive and process the fifth data segment DS5. The fifth data segment DS5 is thus queued in the FIFO memory. The fifth data segment DS5 is provided to the second processing circuit 210*b* when the indication signal IS indicates availability of the second processing circuit 210*b* to receive and process the fifth data segment DS5.

From the time duration T2-T3, the first processing circuit 210*a* and the second processing circuit 210*b* continuously generate and process data segments corresponding to the same input image line (such as the first input image line IIL1) or different input image lines (such as the first and second input image lines IIL1 and IIL2). Thus, the system 100 is able to process different input image lines simultaneously and does not wait to process the second input image line IIL2 until the first input image line IIL1 is processed completely, thereby enabling the system 100 to operate at a high speed.

Referring now to FIGS. 5A-5E, a flow chart 500 illustrating a method for parallelly processing multiple input image lines by the SoC 104, in accordance with an embodiment of the present disclosure is shown.

Figure 5A:
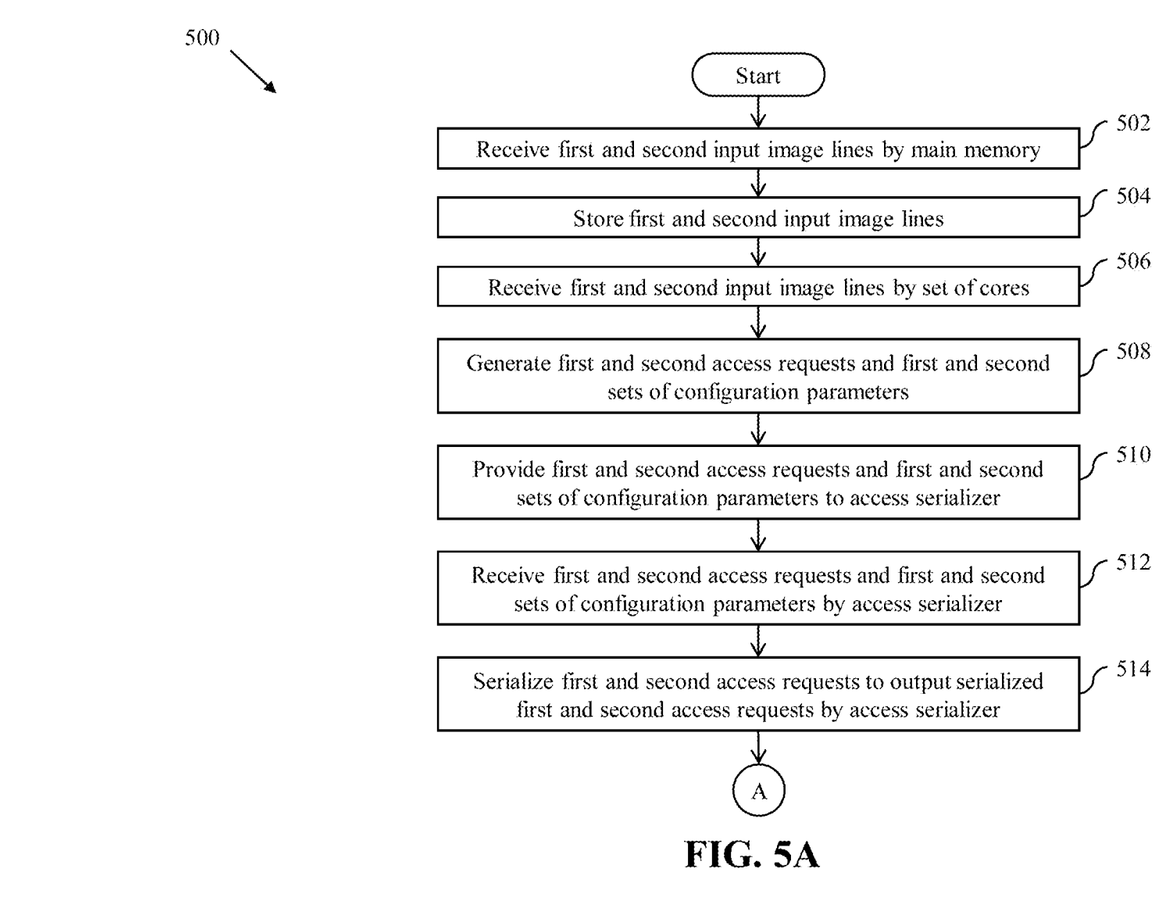
FIGS. 5A-5E, collectively, represent a flow chart that illustrates a method for parallelly processing multiple image lines by the SoC of FIG. 2 in accordance with an embodiment of the present disclosure.

At step 502, the main memory 202 receives the first and second input image lines IIL1 and IIL2 from the first and second image sensors 102*a* and 102*b*, respectively. The first and second image sensors 102*a* and 102*b* have different resolutions and different frame rates. At step 504, the main memory 202 stores the first and second input image lines IIL1 and IIL2. At step 506, the set of cores 204, i.e., the first and second cores 204*a* and 204*b*, receives the first and second input image lines IIL1 and IIL2 from the first and second image sensors 102*a* and 102*b*, respectively.

At step 508, the first and second cores 204*a* and 204*b* generate the first and second access requests AR1 and AR2 and the first and second sets of configuration parameters CP1 and CP2, respectively. The first and second access requests AR1 and AR2 and the first and second sets of configuration parameters CP1 and CP2 are generated based on an order of reception of the first and second input image lines IIL1 and IIL2, respectively. At step 510, the first and second cores 204*a* and 204*b* provide the first and second access requests AR1 and AR2 and the first and second sets of configuration parameters CP1 and CP2 to the access serializer 302, respectively.

At step 512, the access serializer 302 receives the first and second access requests AR1 and AR2 and the first and second sets of configuration parameters CP1 and CP2. At step 514, the access serializer 302 serializes the first and second access requests AR1 and AR2, by executing the scheduling algorithm, to output the serialized first and second access requests SAR1 and SAR2 one after the other. At step 516, the first and second trigger controllers 304*a* and 304*b* receive the serialized first and second access requests SAR1 and SAR2 and the first and second sets of configuration parameters CP1 and CP2, respectively.

Figure 5B:
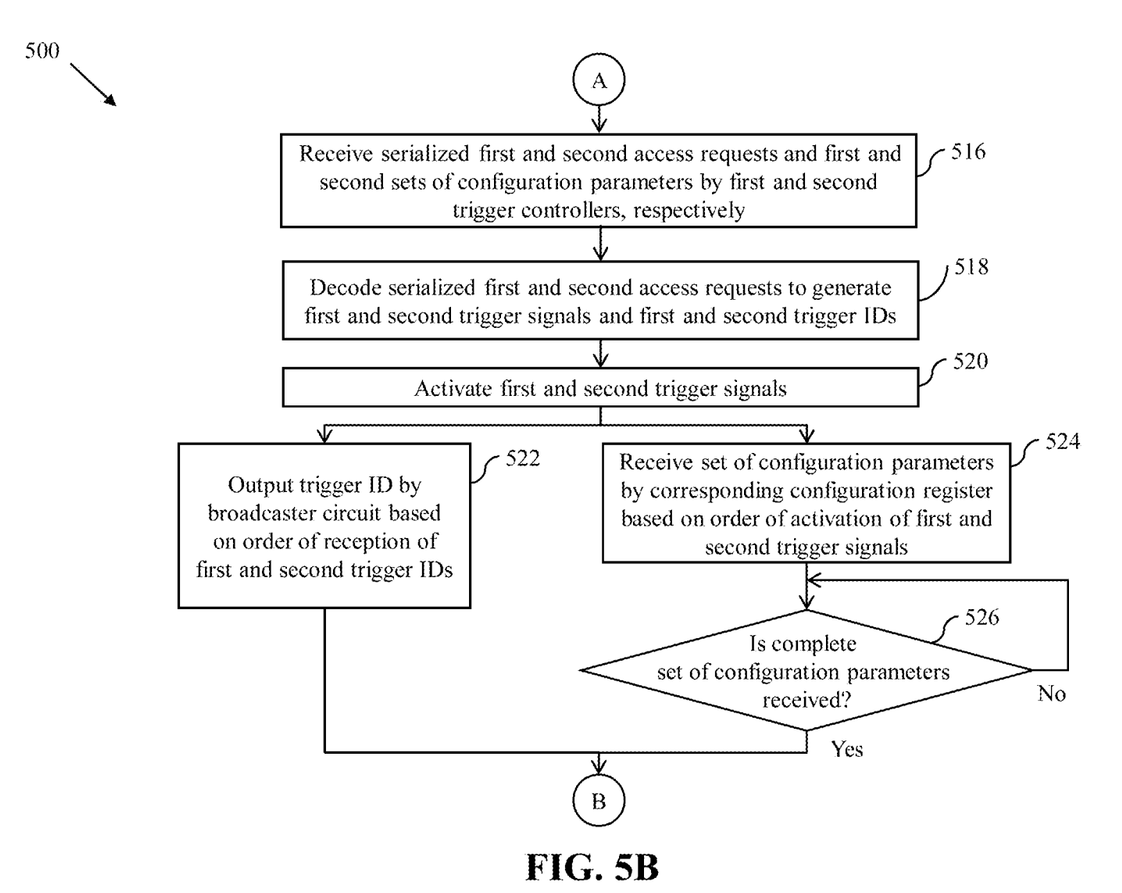

At step 518, the first and second trigger controllers 304a and 304b decode the serialized first and second access requests SAR1 and SAR2 to generate the first and second trigger signals TS1 and TS2 and the first and second trigger IDs TID1 and TID2, respectively. At step 520, the first and second trigger controllers 304a and 304b activate the first and second trigger signals TS1 and TS2, when the first and second trigger controllers 304a and 304b decode the serialized first and second access requests SAR1 and SAR2, respectively. The first and second trigger signals TS1 and TS2 are activated based on an order of generation of the first and second trigger signals TS1 and TS2, respectively. After step 520, steps 522 and 524 are executed simultaneously.

At step 522, the broadcaster circuit 306 outputs a trigger ID, such as one of the first and second trigger IDs TID1 and TID2, based on the order of reception of the first and second trigger IDs TID1 and TID2 by the broadcaster circuit 306 from the first and second trigger controllers 304a and 304b, respectively. For the sake of ongoing discussion and without deviating from the scope of the disclosure, it is assumed that the first trigger ID TID1 is outputted before the second trigger ID TID2.

At step 524, configuration registers, such as the first and second configuration registers 308a and 308b, receive corresponding sets of configuration parameters, such as the first and second sets of configuration parameters CP1 and CP2, based on an order of activation of the first and second trigger signals TS1 and TS2. At step 526, the first and second configuration registers 308a and 308b determine whether the complete first and second sets of configuration parameters CP1 and CP2 are received by the first and second configuration registers 308a and 308b. If at step 526, the first and second configuration registers 308a and 308b determine that the complete first and second sets of configuration parameters CP1 and CP2 are not received, the first and second configuration registers 308a and 308b wait for the complete first and second sets of configuration parameters CP1 and CP2 to be received. If at step 526, the first and second configuration registers 308a and 308b determine that the complete first and second sets of configuration parameters CP1 and CP2 are received, step 528 is executed. Step 528 is executed after the execution of the steps 522 and 526.

Figure 5C:
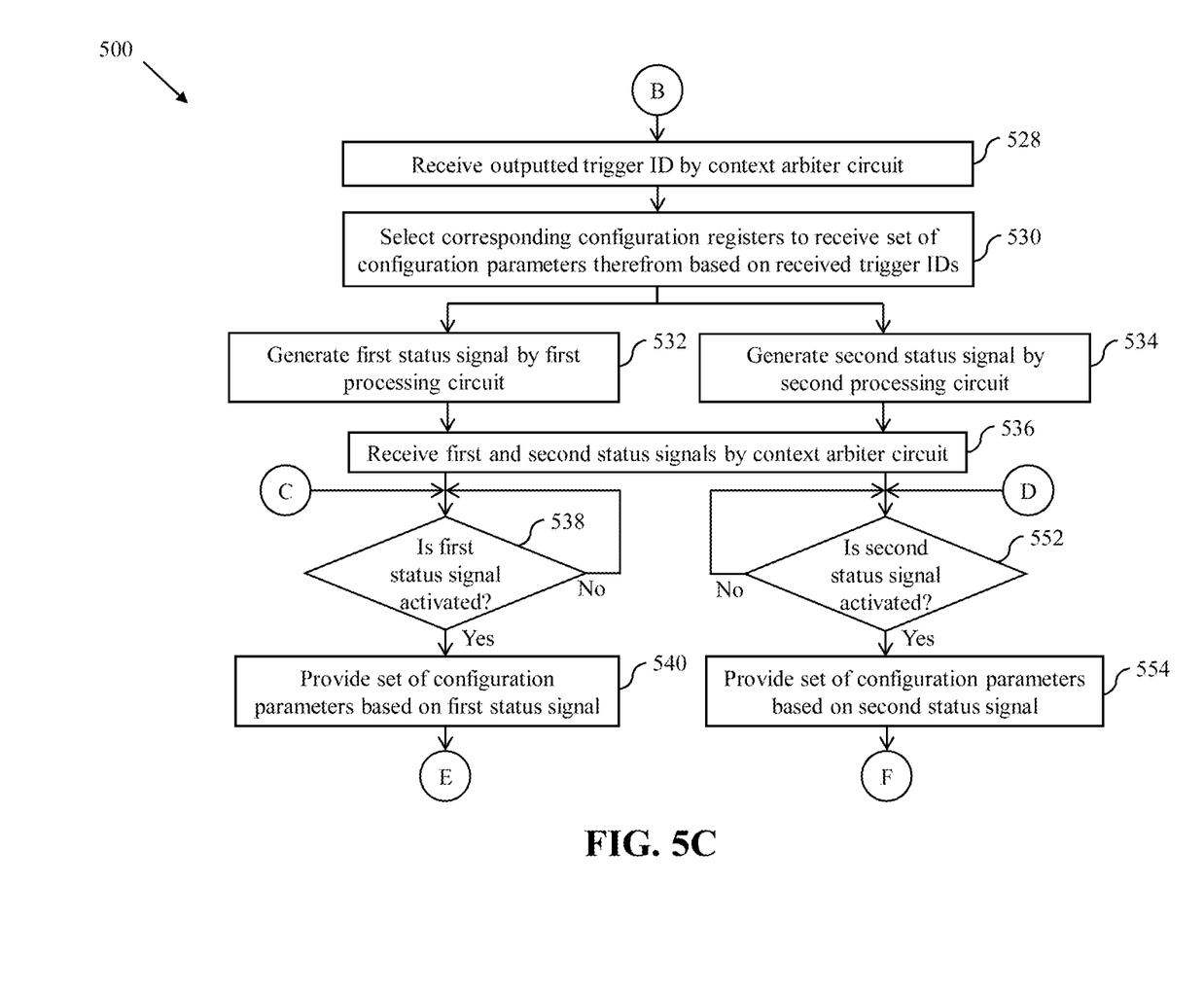

At step 528, the context arbiter circuit 310 receives the outputted trigger IDs, such as the first and second trigger IDs TID1 and TID2, from the broadcaster circuit 306. At step 530, the context arbiter circuit 310 selects corresponding configuration registers, such as the first and second configuration registers 308a and 308b, for receiving the first and second sets of configuration parameters CP1 and CP2 therefrom based on the received trigger IDs. After step 530, steps 532 and 534 are executed simultaneously. At step 532, the first processing circuit 210a generates the first status signal SS1. At step 534, the second processing circuit 210b generates the second status signal SS2. After executing the steps 532 and 534, step 536 is executed.

At step 536, the context arbiter circuit 310 receives the first and second status signals SS1 and SS2 from the first processing circuit 210a and the second processing circuit 210b, respectively. After executing the step 536, steps 538-550 and 552-572 are executed simultaneously. At step 538, the context arbiter circuit 310 determines whether the first status signal SS1 is activated. If at step 538, the context arbiter circuit 310 determines that the first status signal SS1 is not activated (i.e., deactivated), the context arbiter circuit 310 waits for the first status signal SS1 to be activated. If at step 538, the context arbiter circuit 310 determines that the first status signal SS1 is activated, step 540 is executed.

Figure 5D:
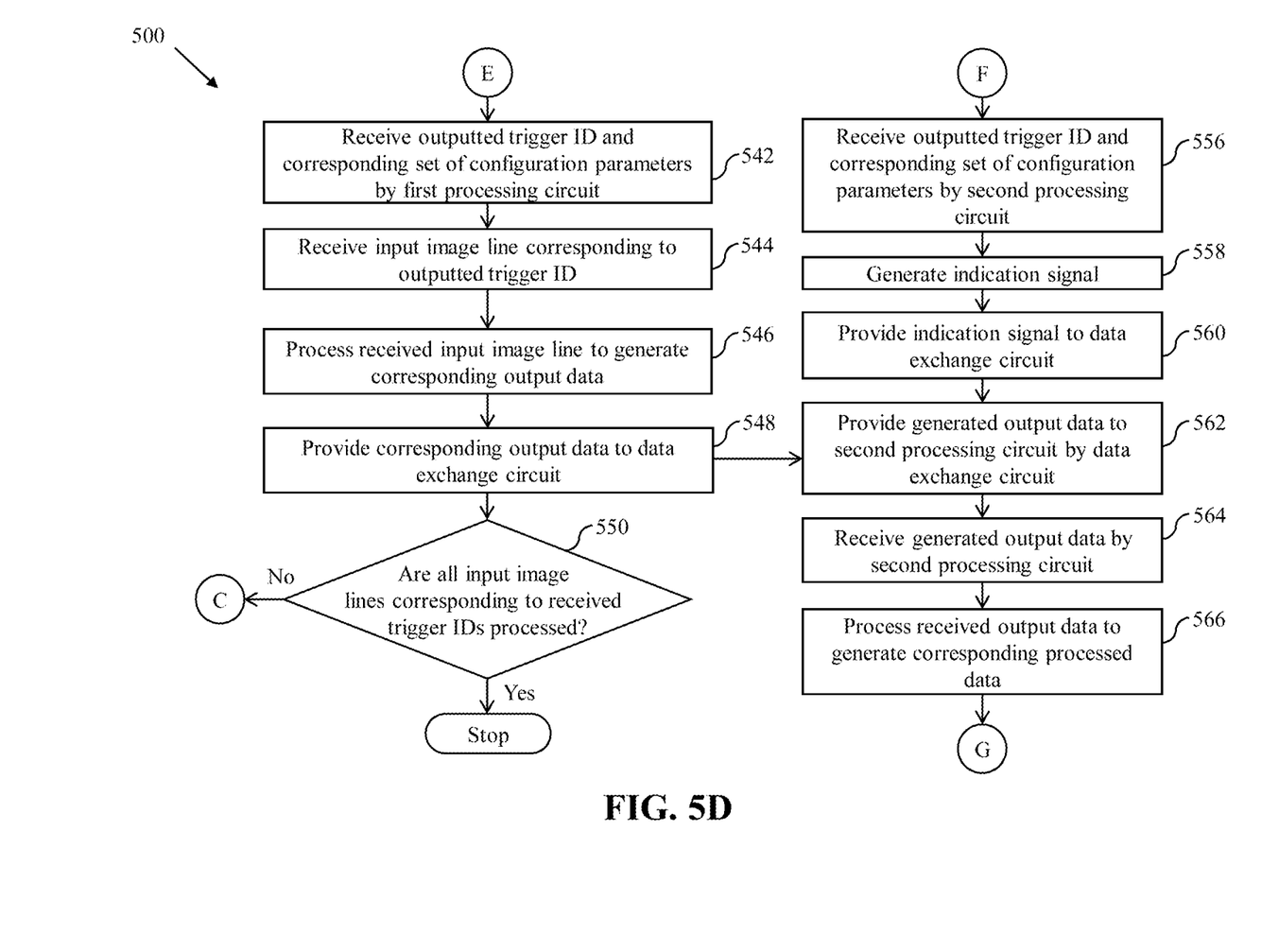

At step 540, the context arbiter circuit 310 provides a set of configuration parameters, such as the first set of configuration parameters CP1, to the first processing circuit 210a based on the first status signal SS1. At step 542, the first processing circuit 210a receives the outputted trigger ID, such as the first trigger ID TID1, and the corresponding set of configuration parameters, such as the first set of configuration parameters CP1, from the context arbiter circuit 310.

At step 544, the first processing circuit 210a receives an input image line, such as the first input image line IIL1, corresponding to the outputted trigger ID, i.e., the first trigger ID TID1, from the main memory 202. At step 546, based on the first trigger ID TID1 and the first set of configuration parameters CP1, i.e., the first set of processing attributes, the first processing circuit 210a processes the received input image line, i.e., the first input image line IIL1, to generate corresponding output data, i.e., the first output data OD1. The first output data OD1 is generated by generating corresponding data segments as explained in FIG. 4. Further, the first status signal SS1 is deactivated when the first processing circuit 210a is processing the first input image line IIL1. At step 548, the first processing circuit 210a provides the corresponding output data, i.e., the first output data OD1, to the data exchange circuit 212 and re-activates the first status signal SS1. At step 550, the first processing circuit 210a determines whether all input image lines, such as the first and second input image lines IIL1 and IIL2, corresponding to the received trigger IDs, such as the first and second trigger IDs TID1 and TID2, are processed by the first processing circuit 210a. Since at step 550, the first processing circuit 210a determines that all input image lines corresponding to the received trigger IDs are not processed by the first processing circuit 210a, the steps 538-550 are executed continuously until all input image lines corresponding to the received trigger IDs are processed by the first processing circuit 210a. Thus, the second input image line IIL2 is processed. After executing the steps 538-548 for processing the second input image line IIL2, at step 550, the first processing circuit 210a determines that all the input image lines corresponding to the received trigger IDs are processed. Thus, the first processing circuit 210a completes the generation of all the output data based on the received input image lines.

Figure 5E:
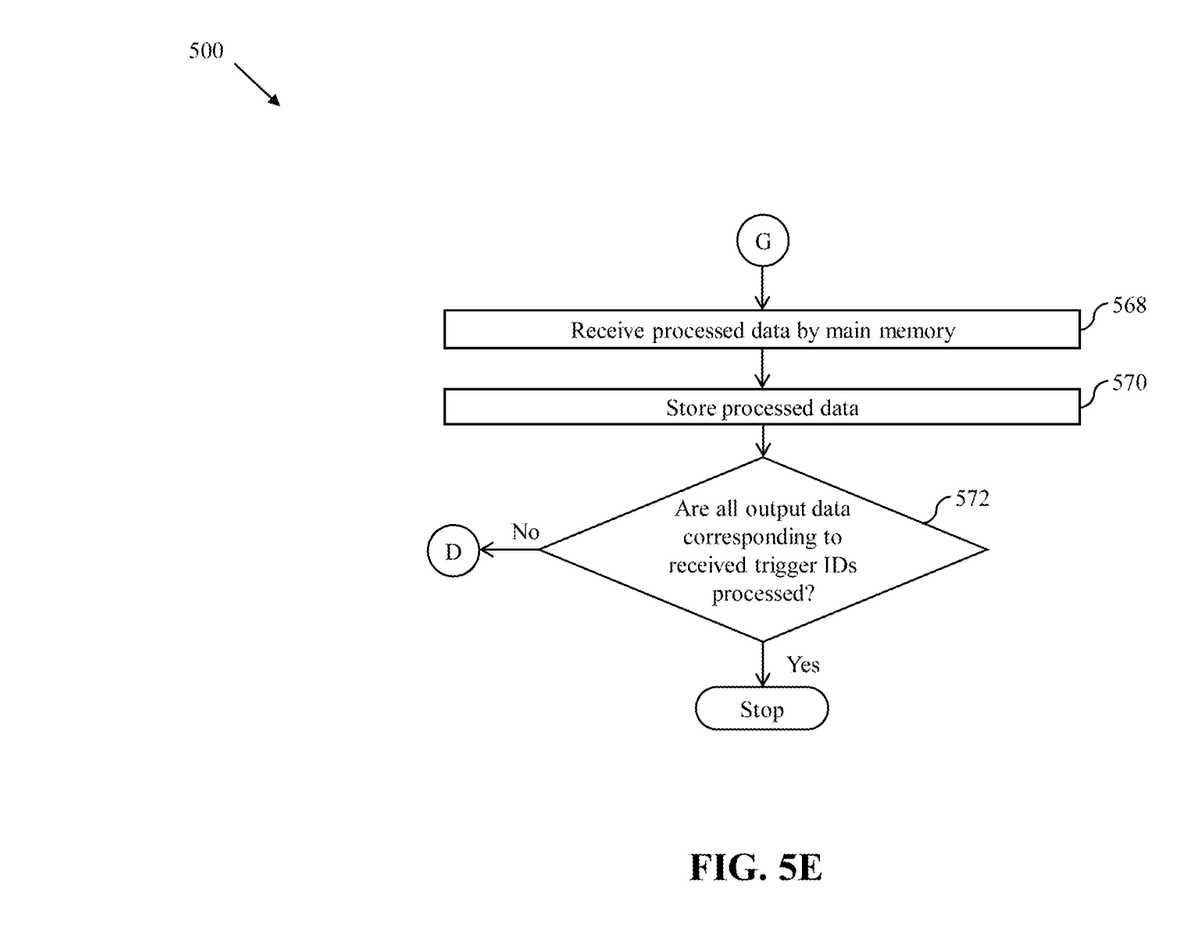

At step 552, the context arbiter circuit 310 determines whether the second status signal SS2 is activated. If at step 552, the context arbiter circuit 310 determines that the second status signal SS2 is deactivated, the context arbiter circuit 310 waits for the second status signal SS2 to be activated. If at step 552, the context arbiter circuit 310 determines that the second status signal SS2 is activated, step 554 is executed.

At step 554, the context arbiter circuit 310 provides a set of configuration parameters, such as the first set of configuration parameters CP1, to the second processing circuit 210b based on the second status signal SS2. At step 556, the second processing circuit 210b receives the outputted trigger ID, such as the first trigger ID TID1, and the corresponding set of configuration parameters, such as the first set of configuration parameters CP1, from the context arbiter circuit 310. At step 558, the second processing circuit 210b generates the indication signal IS. At step 560, the second processing circuit 210b provides the indication signal IS to the data exchange circuit 212. After steps 548 and 560, step 562 is executed.

At step 562, the data exchange circuit 212 provides the generated output data, such as the first output data OD1, to the second processing circuit 210b based on the indication signal IS. At step 564, the second processing circuit 210*b* receives the generated output data, such as the first output data OD1, from the data exchange circuit 212. At step 566, based on the first trigger ID TID1 and the first set of configuration parameters CP1, i.e., the first set of processing attributes, the second processing circuit 210*b* processes the received output data, i.e., the first output data OD1, to generate corresponding processed data, i.e., the first processed data PD1. The second processing circuit 210*b* processes the received output data, i.e., the first output data OD1, parallelly when a subsequent image line, i.e., the second input image line IIL2, is being processed by the first processing circuit 210*a*. The first output data OD1 is processed by way of processing the data segments of the first output data OD1 as explained in FIG. 4. Further, during the processing of the first output data OD1, the second processing circuit 210*b* deactivates the second status signal SS2.

At step 568, the main memory 202 receives the processed data, i.e., the first processed data PD1 from the second processing circuit 210*b*. At step 570, the main memory 202 stores the first processed data PD1. At step 572, the second processing circuit 210*b* determines whether all output data, such as the first and second output data OD1 and OD2, corresponding to the received trigger IDs, such as the first and second trigger IDs TID1 and TID2, are processed by the second processing circuit 210*b*. Since at step 572, the second processing circuit 210*b* determines that all output data corresponding to the received trigger IDs are not processed by the second processing circuit 210*b*, the steps 552 to 570 are executed continuously to process the second output data OD2. Further, the step 572 is executed, and the second processing circuit 210*b* determines that all output data corresponding to the received trigger IDs are processed by the second processing circuit 210*b*. Thus, the second processing circuit 210*b* completes the generation of all the processed data, thereby completing the processing of the input image lines.

The system 100 does not employ stitching of input image lines received from the first and second image sensors 102*a* and 102*b*. Thus, the latency incurred by the system 100 as compared to the latency incurred due to stitching of image lines employed by conventional image processing systems for on-the-fly processing of each input image is reduced. Further, a quality of the first and second processed data PD1 and PD2 remains unaffected due to a difference in exposure values and difference in resolutions of the first and second image sensors 102*a* and 102*b* as the processing of the first and second input image lines IIL1 and IIL2 is based on a set of configuration parameters (i.e., the first and second sets of configuration parameters CP1 and CP2) and associated trigger IDs, such as the first and second trigger IDs TID1 and TID2. In addition, the first processing circuit 210*a* and the second processing circuit 210*b* are able to process same or different input image lines, such as the first and second input image lines IIL1 and IIL2, parallelly by way of the data exchange circuit 212 as compared to conventional processing systems that were able to process only a single input image line at a time. Thus, a processing overhead and a delay in processing of the multiple input image lines is reduced by utilizing the system 100 as compared to utilizing the conventional image processing systems.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

The invention claimed is:

1. A system-on-chip (SoC), comprising:
    first and second processing circuits, wherein the first processing circuit is configured to receive and process a first image line based on a first set of processing attributes to generate first output data, and a second image line based on a second set of processing attributes to generate second output data, and wherein the second image line is processed after the first image line is processed; and
    a data exchange circuit coupled between the first processing circuit and the second processing circuit, wherein the data exchange circuit is configured to provide the first and second output data from the first processing circuit to the second processing circuit based on an availability of the second processing circuit to process the first and second output data, respectively, and wherein the second processing circuit is configured to parallelly process the first output data when the first processing circuit processes the second image line.

2. The SoC of claim 1, wherein the second processing circuit is further configured to process the second output data after the first output data is processed, and wherein the first and second output data are processed based on the first and second sets of processing attributes, respectively.

3. The SoC of claim 1, further comprising:
    an arbitration circuit that is configured to receive first and second access requests and first and second sets of configuration parameters that are associated with the processing of the first and second image lines, respectively, generate first and second trigger identifiers (IDs) based on the first and second access requests, respectively, and output the first and second trigger IDs and the first and second sets of configuration parameters, respectively, wherein the first set of processing attributes includes the first trigger ID and the first set of configuration parameters, and the second set of processing attributes includes the second trigger ID and the second set of configuration parameters.

4. The SoC of claim 3, further comprising:
    a set of cores that is coupled with the arbitration circuit, and is configured to receive the first and second image lines, generate the first and second access requests and the first and second sets of configuration parameters, and provide the first and second access requests and the first and second sets of configuration parameters, respectively, to the arbitration circuit.

5. The SoC of claim 4, wherein the arbitration circuit comprises:
    an access serializer that is coupled with the set of cores, and is configured to receive the first and second access requests and the first and second sets of configuration parameters, respectively, serialize the first and second access requests, and output the serialized first and second access requests and the first and second sets of configuration parameters, respectively, wherein the access serializer serializes the first and second access requests by executing a scheduling algorithm such that when the first and second access requests are received simultaneously, the access serializer outputs the serialized first and second access requests one after the other;
    first and second trigger controllers that are coupled with the access serializer, and are configured to receive the serialized first and second access requests and the first and second sets of configuration parameters, respectively, and decode the serialized first and second access requests to generate first and second trigger signals and the first and second trigger IDs, respectively, wherein the first and second trigger controllers are further configured to activate the first and second trigger signals upon decoding the serialized first and second access requests, respectively; and first and second configuration registers that are coupled with the first and second trigger controllers, and are configured to receive the first and second trigger signals, and receive the first and second sets of configuration parameters from the first and second trigger controllers when the first and second trigger signals are activated, respectively.

6. The SoC of claim 5, wherein the arbitration circuit further comprises:
a broadcaster circuit that is coupled with the first and second trigger controllers, and is configured to receive the first and second trigger IDs and output the first and second trigger IDs based on an order of reception of the first and second trigger IDs, respectively; and
a context arbiter circuit that is coupled with the broadcaster circuit, and is configured to:
receive the first and second trigger IDs from the broadcaster circuit,
receive first and second status signals,
select the first and second configuration registers based on the first and second trigger IDs for receiving the first and second sets of configuration parameters therefrom, and
provide at least one of the first and second sets of configuration parameters to the first processing circuit when the first status signal is activated, and at least one of the first and second sets of configuration parameters to the second processing circuit when the second status signal is activated.

7. The SoC of claim 3, wherein the first processing circuit comprises:
a first receiver that is coupled with the arbitration circuit, and is configured to receive the first and second trigger IDs and generate a first reception signal that is indicative of a reception of at least one of the first and second trigger IDs by the first receiver; and
a first kernel that is coupled with the first receiver and the arbitration circuit, and is configured to:
(i) receive the first reception signal and at least one of the first and second sets of configuration parameters based on a first status signal,
(ii) receive the first and second image lines,
(iii) process, based on the first reception signal, at least one of the first and second image lines to generate at least one of the first and second output data, respectively, and
(iv) generate and provide the first status signal to the arbitration circuit, wherein the first kernel is further configured to activate the first status signal for receiving at least one of the first and second sets of configuration parameters, and deactivate the first status signal when the first kernel is processing at least one of the first and second image lines.

8. The SoC of claim 3, wherein the second processing circuit comprises:
a second receiver that is coupled with the arbitration circuit, and is configured to receive the first and second trigger IDs and generate a second reception signal that is indicative of a reception of at least one of the first and second trigger IDs by the second receiver; and
a second kernel that is coupled with the second receiver, the arbitration circuit, and the data exchange circuit, and is configured to:
(i) receive the second reception signal and at least one of the first and second sets of configuration parameters based on a second status signal,
(ii) receive the first and second output data from the data exchange circuit,
(iii) process, based on the second reception signal, at least one of the first and second output data to generate at least one of first and second processed data, respectively, and
(iv) generate and provide the second status signal to the arbitration circuit, wherein the second kernel is further configured to activate the second status signal for receiving at least one of the first and second sets of configuration parameters, and deactivate the second status signal when the second kernel is processing at least one of the first and second output data.

9. The SoC of claim 8, further comprising:
a main memory that is coupled with the second processing circuit, and is configured to receive the first and second image lines and the first and second processed data, and store the first and second image lines and the first and second processed data, respectively.

10. The SoC of claim 1, wherein the first output data comprises first and second data segments, and wherein the data exchange circuit is further configured to provide the first data segment received from the first processing circuit to the second processing circuit when the second processing circuit is available to receive the first data segment such that the second processing circuit processes the first data segment and the first processing circuit parallelly generates the second data segment.

11. The SoC of claim 1, wherein the second processing circuit is further configured to generate an indication signal and provide the indication signal to the data exchange circuit to indicate the availability of the second processing circuit for processing at least one of the first and second output data.

12. The SoC of claim 1, wherein the SoC is coupled with external first and second image sensors, wherein the first and second image lines are captured by the first and second image sensors, respectively, and wherein the first and second image sensors have different resolutions and different frame rates.

13. A method for processing a plurality of image lines, the method comprising:
processing, by a first processing circuit of a system-on-chip (SoC), a first image line of the plurality of image lines based on a first set of processing attributes to generate first output data, and a second image line of the plurality of image lines based on a second set of processing attributes to generate second output data, wherein the second image line is processed after the first image line is processed;
providing, by a data exchange circuit of the SoC, the first and second output data from the first processing circuit to a second processing circuit of the SoC based on an availability of the second processing circuit to process the first and second output data, respectively; and
processing, by the second processing circuit, the first output data parallelly when the second image line is being processed by the first processing circuit.

14. The method of claim 13, further comprising:
processing, by the second processing circuit, the second output data after the first output data is processed, wherein the first and second output data are processed based on the first and second sets of processing attributes, respectively.

15. The method of claim 14, further comprising:
generating, by the first processing circuit, a first status signal, wherein the first status signal is activated based on an availability of the first processing circuit to receive at least one of the first and second sets of processing attributes, and the first status signal is deactivated when at least one of the first and second image lines are being processed by the first processing circuit; and
generating, by the second processing circuit, a second status signal, wherein the second status signal is activated based on an availability of the second processing circuit to receive at least one of the first and second sets of processing attributes, and the second status signal is deactivated when at least one of the first and second output data are being processed by the second processing circuit.

16. The method of claim 13, further comprising:
generating, by an arbitration circuit of the SoC, first and second trigger identifiers (IDs) based on first and second access requests and first and second sets of configuration parameters that are associated with the processing of the first and second image lines, respectively, wherein the first set of processing attributes includes the first trigger ID and the first set of configuration parameters, and the second set of processing attributes includes the second trigger ID and the second set of configuration parameters.

17. The method of claim 16, further comprising:
serializing, by an access serializer of the arbitration circuit, the first and second access requests to output the serialized first and second access requests, wherein the first and second access requests are serialized by executing a scheduling algorithm such that when the first and second access requests are received simultaneously, the serialized first and second access requests are outputted one after the other by the access serializer;
receiving the serialized first and second access requests and the first and second sets of configuration parameters, by first and second trigger controllers of the arbitration circuit from the access serializer, respectively;
decoding the serialized first and second access requests, by the first and second trigger controllers to generate first and second trigger signals and the first and second trigger IDs, respectively, wherein the first and second trigger signals are activated upon decoding the serialized first and second access requests, respectively; and
outputting, by a broadcaster circuit of the arbitration circuit, the first and second trigger IDs based on an order of reception of the first and second trigger IDs by the broadcaster circuit.

18. The method of claim 16, further comprising:
receiving, by a context arbiter circuit of the arbitration circuit, the first and second trigger IDs and first and second status signals;
selecting, by the context arbiter circuit based on the first and second trigger IDs, first and second configuration registers of the arbitration circuit to receive the first and second sets of configuration parameters therefrom; and
providing, by the context arbiter circuit, at least one of the first and second sets of configuration parameters to the first processing circuit when the first status signal is activated, and at least one of the first and second sets of configuration parameters to the second processing circuit when the second status signal is activated.

19. The method of claim 13, further comprising:
generating, by the second processing circuit, an indication signal; and
providing, by the second processing circuit to the data exchange circuit, the indication signal to indicate the availability of the second processing circuit for processing at least one of the first and second output data.

20. The method of claim 13, wherein the first output data comprises first and second data segments, and wherein the first data segment is provided from the first processing circuit to the second processing circuit by the data exchange circuit such that the first data segment is processed by the second processing circuit and the second data segment is parallelly generated by the first processing circuit.

* * * * *